US008526778B2

(12) United States Patent
Lee et al.

(10) Patent No.: US 8,526,778 B2
(45) Date of Patent: Sep. 3, 2013

(54) APPARATUS AND METHOD FOR PHOTOGRAPHING AND EDITING MOVING IMAGE

(75) Inventors: Ju-Youn Lee, Seongnam-si (KR); In-Sik Myung, Icheon (KR); Hyun-Joo Kang, Suwon-si (KR); Joo-Kyung Woo, Seoul (KR); Deok-Won Kim, Incheon (KR); Sun-Wha Chung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 846 days.

(21) Appl. No.: 12/275,670

(22) Filed: Nov. 21, 2008

(65) Prior Publication Data

US 2009/0142030 A1 Jun. 4, 2009

(30) Foreign Application Priority Data

Dec. 4, 2007 (KR) .................. 10-2007-0125024

(51) Int. Cl.
*H04N 5/77* (2006.01)
(52) U.S. Cl.
USPC .......................................... 386/224; 386/241
(58) Field of Classification Search
None
See application file for complete search history.

(56) References Cited

U.S. PATENT DOCUMENTS

| 5,796,429 A * | 8/1998 | Suzuki et al. ............ 348/239 |
| 2002/0019833 A1 * | 2/2002 | Hanamoto ................ 707/500 |
| 2004/0001079 A1 * | 1/2004 | Zhao et al. .............. 345/719 |
| 2008/0182628 A1 * | 7/2008 | Lee et al. ................ 455/566 |
| 2008/0215984 A1 * | 9/2008 | Manico et al. ............ 715/730 |

FOREIGN PATENT DOCUMENTS

| JP | 2002-324036 | 11/2002 |
| JP | 2004-015436 | 1/2004 |
| JP | 2004-32277 | 1/2004 |
| JP | 2005-26752 | 1/2005 |
| JP | 2006-5742 | 1/2006 |
| JP | 2006-174318 | 6/2006 |
| JP | 2006-332789 | 12/2006 |
| JP | 2006-339935 | 12/2006 |
| JP | 2007-208761 | 8/2007 |
| JP | 2007-529951 | 10/2007 |
| KR | 2006-16135 | 2/2006 |

OTHER PUBLICATIONS

Chinese Office Action issued by the SIPO for Chinese Patent Application No. 200810183013.1 on Dec. 26, 2011.
Japanese Office Action issued Jun. 18, 2013 in counterpart Japanese Patent Application No. 2008-308447 (3 pages, in Japanese).

* cited by examiner

*Primary Examiner* — Huy T Nguyen
(74) *Attorney, Agent, or Firm* — NSIP Law

(57) ABSTRACT

An apparatus and method for capturing and editing a moving image according to a theme of the moving image, the apparatus including: a theme selector to select the theme of the moving image to be captured; a scene selector to select, according to a user command, a scene clip from a plurality of scene clips of a story board of the moving image to be captured, the story board provided according to the theme selected by the theme selector; and a photographing unit to capture a portion of the moving image corresponding to the selected scene clip while a template corresponding to the selected scene clip is displayed on a display screen.

41 Claims, 14 Drawing Sheets

APPARATUS AND METHOD FOR PHOTOGRAPHING AND EDITING MOVING IMAGE

CROSS-REFERENCE TO RELATED APPLICATION

This application claims the benefit of Korean Application No. 2007-125024 filed Dec. 4, 2007 in the Korean Intellectual Property Office, the disclosure of which is incorporated herein by reference

BACKGROUND OF THE INVENTION

1. Field of the Invention

Aspects of the present invention relate to an apparatus and method for capturing and editing a moving image, and, more particularly, to an apparatus and method for easily capturing and editing a moving image in a mobile environment.

2. Description of the Related Art

Generally, in order to capture still images using a mobile device (such as a mobile phone), a background frame is first chosen prior to capturing (i.e., photographing). Once capturing is completed, the background frame is placed on a layer of a display screen, and a picture frame that is directly captured by the user is placed at a central mask area of the display screen. In such a manner, two picture frames are combined into a composite image.

The recent trend of moving image user created content (UCC) currently being produced is toward moving image UCC with particular themes (for example, broadcast parodies such as drama, comedy, exercise training, or a cooking course). That is, simply inserting a background frame into a subject picture image will not complete captured moving image UCC.

In this case, by setting a template suitable for the moving image in advance, it is possible to allow even a user who is unfamiliar with capturing moving images to easily create moving image UCC.

Furthermore, with the recent proliferation of moving image UCC, there is an increasing demand for sharing moving images captured and edited with a mobile device. Conventionally, users download moving images captured by digital cameras or camcorders using their personal computers (PC), edit the moving images, and then upload the edited moving images to the Internet for sharing.

Some existing smart phones are equipped with moving image editor functions. However, these smart phones have inadequate editing functions and are not user friendly. For example, the Samsung Smartphone M4500 has a built-in moving image editor application. In order for a user to edit a moving image effect, a complex procedure, which may involve a five to six operation user interface, is provided.

In Korean Patent Registration No. 0652763 entitled, "A Method and Apparatus for Editing Moving Image File of a Mobile Terminal," a technology of simply adjusting lengths of moving images is described, without teaching ways editing the moving image in a diversified manner (such as imparting a screen transition effect to the moving image). That is, the disclosed patent is not closely related to a technology of processing moving images captured by mobile terminals.

In addition, a PC-based moving image editor application (such as Adobe Premiere) is suitably applied in an environment where the interface is a large-sized display and a mouse exists. However, the PC-based moving image editor application is not applicable in a display-input limited environment, such as a mobile device.

In addition, a web-based moving image editor application (such as Jumpcut) that has a plainer user interface (UI) configuration (such as a preview screen, a timeline, a story board panel, and/or an effect panel) is not suitable for a limited display, such as a mobile device.

SUMMARY OF THE INVENTION

Aspects of the present invention provide an apparatus and method for capturing and editing a moving image according to a theme of the moving image, by which a user can easily capture and edit the moving image adaptable to various types of themes to be captured. Aspects of the present invention also provide an apparatus to edit a moving image according to a theme of the moving image that can easily and effectively edit the moving image captured in a mobile environment.

According to an aspect of the present invention, there is provided a an apparatus to capture a moving image based on a theme of the moving image, the apparatus including: a theme selector to select a theme of the moving image to be captured (or photographed) according to a user command; a scene selector to select, according to another user command, a scene clip from a plurality of scene clips of a story board of the moving image to be captured, the story board provided according to the theme selected by the theme selector; and a photographing unit to capture a portion of the moving image corresponding to the selected scene clip while a template corresponding to the selected scene clip is displayed on a display screen.

According to another aspect of the present invention, there is provided a method of capturing a moving image based on a theme of the moving image, the method including: selecting a theme of the moving image to be captured according to a user command; providing a story board including a plurality of scene clips according to the selected theme; selecting a scene clip of the story board and providing a template corresponding to the selected scene clip; and capturing a portion of the moving image corresponding to the selected scene clip while the template corresponding to the selected scene clip is displayed on a display screen.

According to still another aspect of the present invention, there is provided a mobile device to edit a moving image, the mobile device including a display unit to display: a story mode user interface in which a moving image file stored in the mobile device is opened and a plurality of scene clips of the moving image file are displayed sequentially in a story board; and a trimming mode user interface in which one or more scene clips selected by a user from the plurality of scene clips in the story mode user interface are displayed, and a trimming operation is performed on the one or more selected scene clips according to a user command.

According to a yet another aspect of the present invention, there is provided a method of editing a moving image in a mobile device, the method including: opening a moving image file; providing a plurality of scene clips of the opened moving image file sequentially in a story board; and connecting two or more of the scene clips in the story board with one another to be edited into a moving image.

According to another aspect of the present invention, there is provided a computer readable recording medium encoded with the method and implemented by a computer.

According to still another aspect of the present invention, there is provided a mobile device to edit a moving image, the mobile device including: a storage unit to store a moving image file; a story mode unit to load the moving image file, to provide a plurality of scene clips of the moving image file sequentially in a story board, and to select a scene clip of the plurality of scene clips according to a user command; and a trimming unit to perform a trimming operation on the selected scene clip according to a user command.

According to yet another aspect of the present invention, there is provided a mobile device to capture and to edit a moving image, the mobile device including: a photographing unit to capture the moving image; a story mode unit to provide a plurality of scene clips of the moving image file sequentially in a story board, and to select a scene clip of the plurality of scene clips according to a user command; and a trimming unit to perform a trimming operation on the selected scene clip according to a user command.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
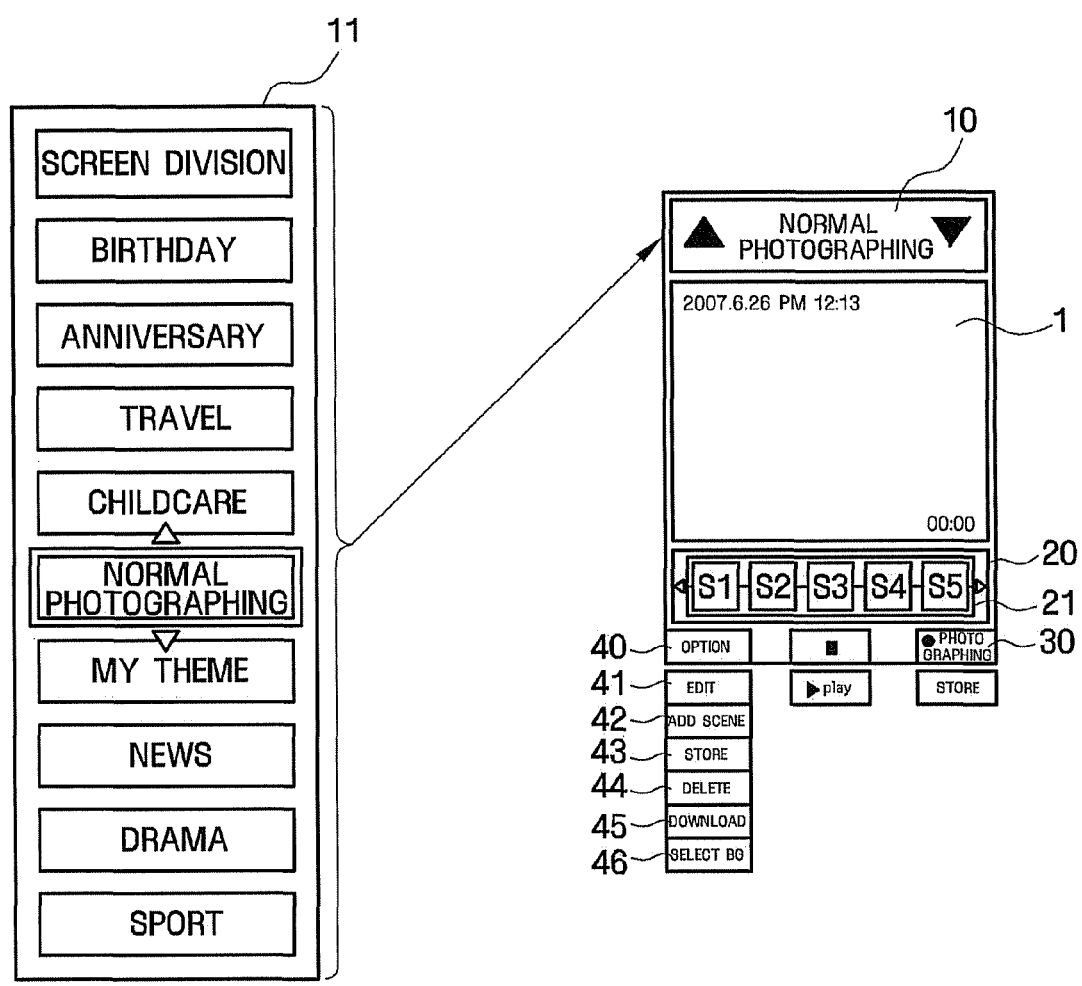
FIG. 1 is a schematic diagram of an apparatus to capture a moving image theme according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic diagram of an apparatus to capture a moving image theme according to an embodiment of the present invention. Referring to FIG. 1, the moving image-theme-photographing apparatus includes a theme selector 10, a scene selector 20, a photographing unit 30, and an option unit 40. Here, the moving image-theme-capturing apparatus according to aspects of the present invention can be applied to mobile devices (such as mobile phones, digital cameras, camcorders, etc.).

The theme selector 10 receives a command from a user to select a type of a theme 11 to be photographed (i.e., captured) as desired by the user. The command may be received by a manipulation of input devices (such as upper and lower buttons). While the types of themes 11 in the current embodiment include Screen Division, Birthday, Anniversary, Travel, Childcare, Normal Photographing, My Theme, News, Drama, and Sport, the types of themes 11 are not limited thereto, and may include other and/or additional types in other embodiments.

The scene selector 20 receives a command to select scene clips of a story board 21 provided according to the type of theme 11 selected by the theme selector 10. The scene clips may include an intro scene clip (IN) corresponding to an introductory scene of the story board 21, photograph scene clips S1, S2, S3, S4, and S5 corresponding to various display screens of the story board 21, and an outro scene clip (OUT) corresponding to an ending scene of the story board 21.

The photographing unit 30 receives a photographing (i.e., capturing) command in a state in which a template selected by the scene selector 20 corresponding to each scene clip is displayed on the display screen 1.

The option unit (Option) 40 receives a command to set a predetermined option for each scene clip of the story board 21. While in the current embodiment the option unit 40 includes a template editor (Edit) 41, a theme creator (Add Scene) 42, a scene storage unit (Store) 43, a scene deletion unit (Delete) 44, a theme download unit (Download) 45, and a background selector (Select BG) 46, aspects of the present invention are not limited thereto and the option unit may include other and/or different configurations.

The template editor 41 receives a command to edit a background frame, caption, music, video, and/or item effect of the corresponding template for each scene clip of the story board 21. The theme creator 42 receives a command to allow a user to directly create a new theme template. In more detail, the theme creator 42 adds a scene clip to the story board 21, edits a corresponding template effect to the story board, edits a template effect for the added scene clip, and stores the edited template as a new theme template. The theme download unit 45 receives a command to download a new theme template. For example, the new theme template may be downloaded from a service provider via the Internet and/or a wired and/or wireless connection.

A method of capturing a moving image theme according to an embodiment of the present invention will now be described in detail with reference to FIGS. 2A through 5.

Figure 2A:
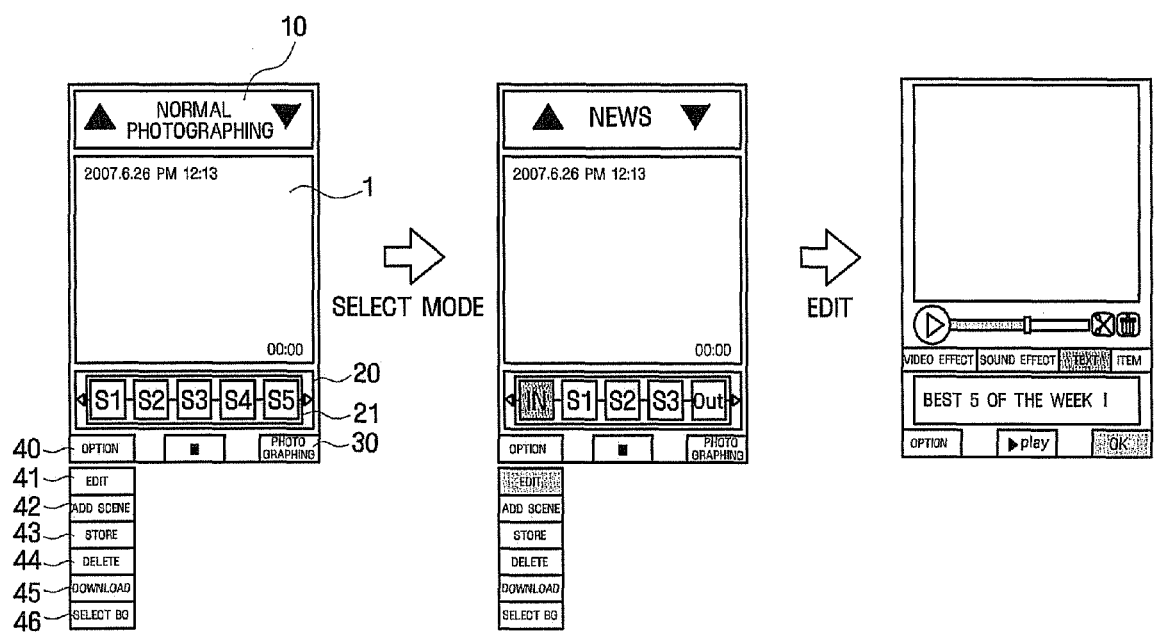
FIGS. 2A through 2C are diagrams illustrating a sequence of display screens in a method of capturing a moving image theme according to an embodiment of the present invention.
Figure 2B:
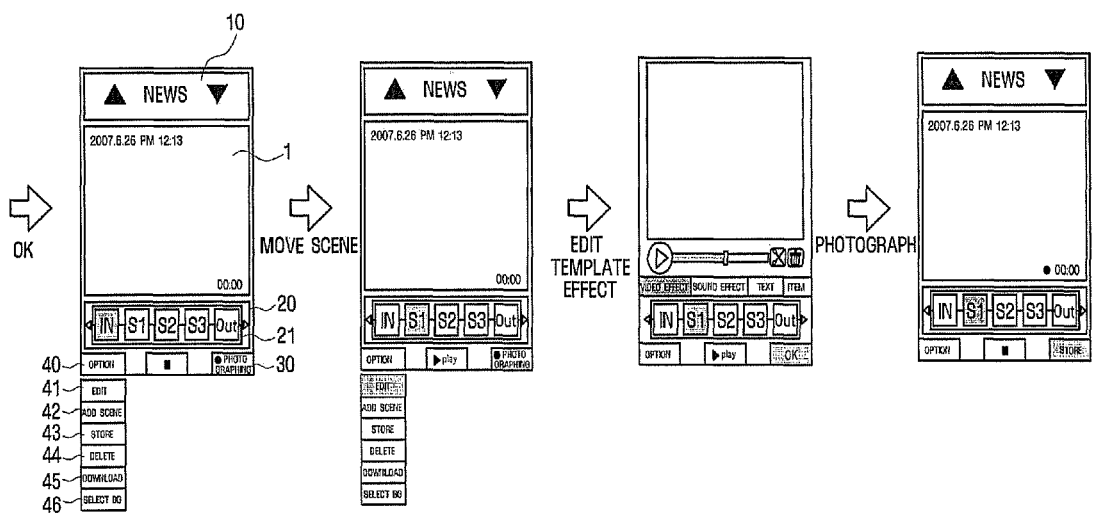
Figure 2C:
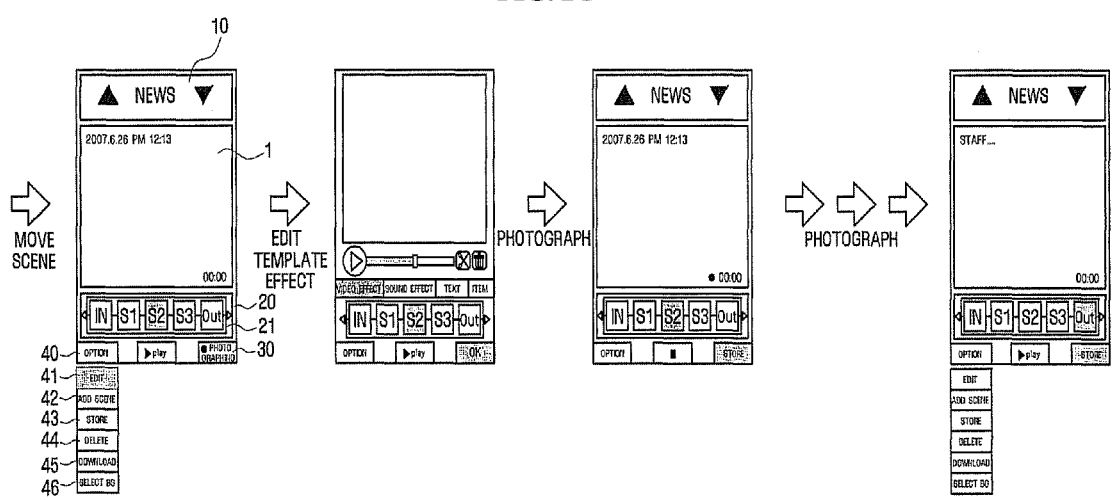
Figure 3:
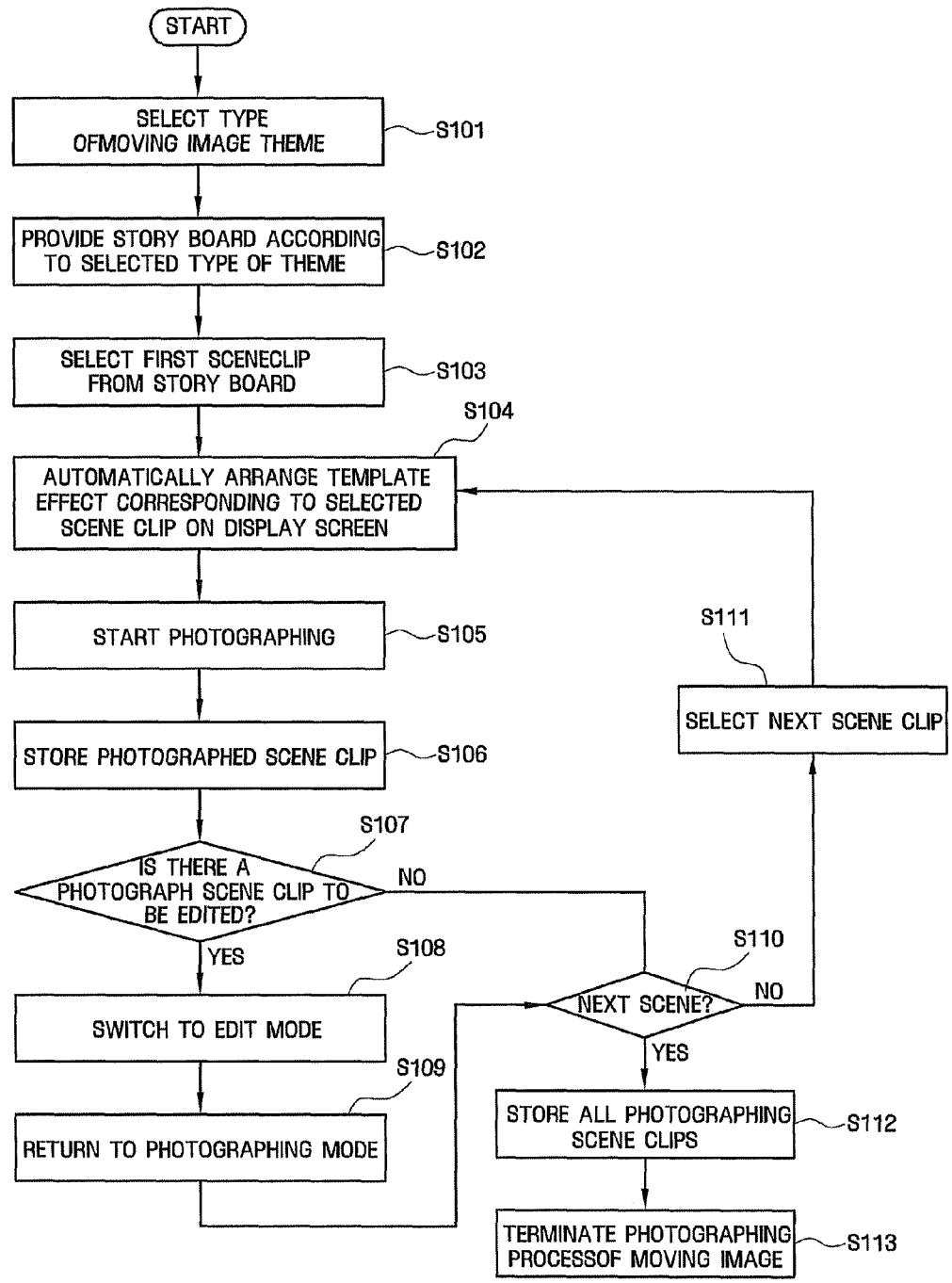
FIG. 3 is a flowchart illustrating a method of capturing a moving image theme according to an embodiment of the present invention.

FIGS. 2A through 2C are diagrams illustrating a sequence of display screens in a method of capturing a moving image according to an embodiment of the present invention, and FIG. 3 is a flowchart illustrating a method of capturing a moving image theme according to an embodiment of the present invention.

Referring to FIGS. 2A and 3, the theme selector 10 selects a type of a theme of a moving image according to a user input in operation S101. For example, the type of theme selected includes at least one of Screen Division, Birthday, Anniversary, Travel, Childcare, Normal Photographing, My Theme, News, Drama, and Sport. In the current description, aspects of the present invention are explained with regard to the News theme selected by the theme selector 10 by way of example.

Next, the story board 21 having multiple scene clips is provided according to the selected type of theme in operation S102. When the respective scene clips of the story board 21 are sequentially selected, the templates corresponding to the respective scene clips are displayed on the display screen 1 such that photographing (i.e., capturing) is performed in a state in which a template for each scene clip is displayed.

In more detail, as shown in FIG. 2B, when a first scene clip S1 is selected from the story board 21 in operation S103, a background frame, caption, music, video, and/or item effect of the template assigned to the selected scene clip S1 are automatically arranged on the display screen in operation S104. It is understood that the aforementioned effects of the template are examples, and additional, less, and/or other effects may be provided in other aspects of the present invention.

In a state in which the corresponding template is displayed on the display screen 1, a photographing button is pressed and the first scene clip S1 of the story board 21 is photographed (i.e., captured) in operation S105, and stored in operation S106. At this point, the background frame, caption, music, video, and/or item effect of the corresponding template can be immediately edited and the photograph scene can be immediately edited.

Although not shown, if the intro scene clip (IN) or the outro scene clip (OUT) is selected, a title or ending can be input to the corresponding template in an edit mode.

After completing photographing (i.e., capturing) for each scene clip, in a case where there is a scene clip to be immediately edited in operation S107, the template editor (Edit) 41 is selected in the option unit (Option) 40 for the scene clip to be edited, as illustrated in FIG. 2C. Then, the scene clip is entered into an Edit mode so that the background frame, caption, music, video, and/or item effect of the corresponding template can be edited in operation S108.

Thereafter, the mode is returned to a photographing mode in operation S109. If there is another scene clip to be photographed (i.e., captured) in the photographing mode in operation S110, the other scene clip is selected in operation S111 and photographing and editing are then performed in the same manner as that performed on the first scene clip S1. If there is no other scene, all the scene photographed clips are stored in operation S112 and the moving-image-theme-capturing process is terminated in operation S113.

Figure 4A:
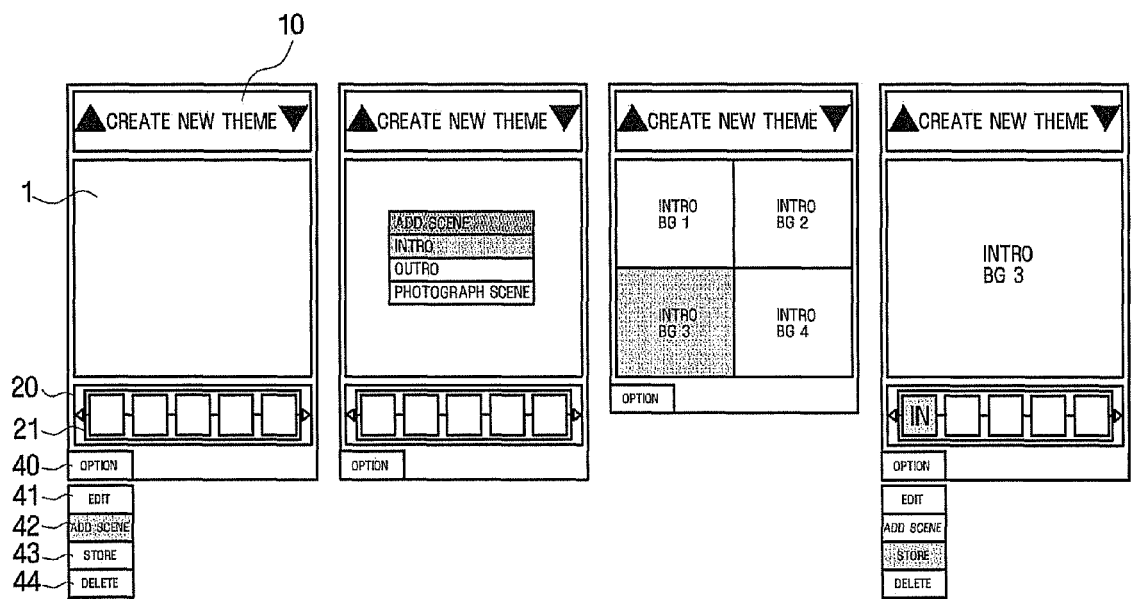
FIGS. 4A through 4C are diagrams illustrating a sequence of display screens in a method of creating a moving image theme according to an embodiment of the present invention.
Figure 4B:
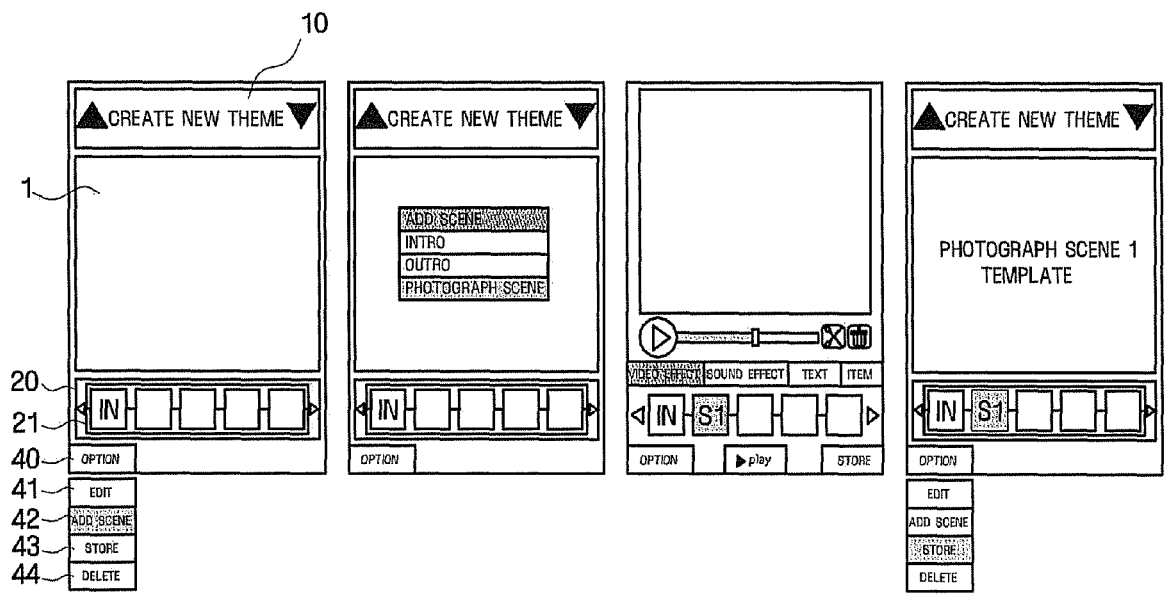
Figure 4C:
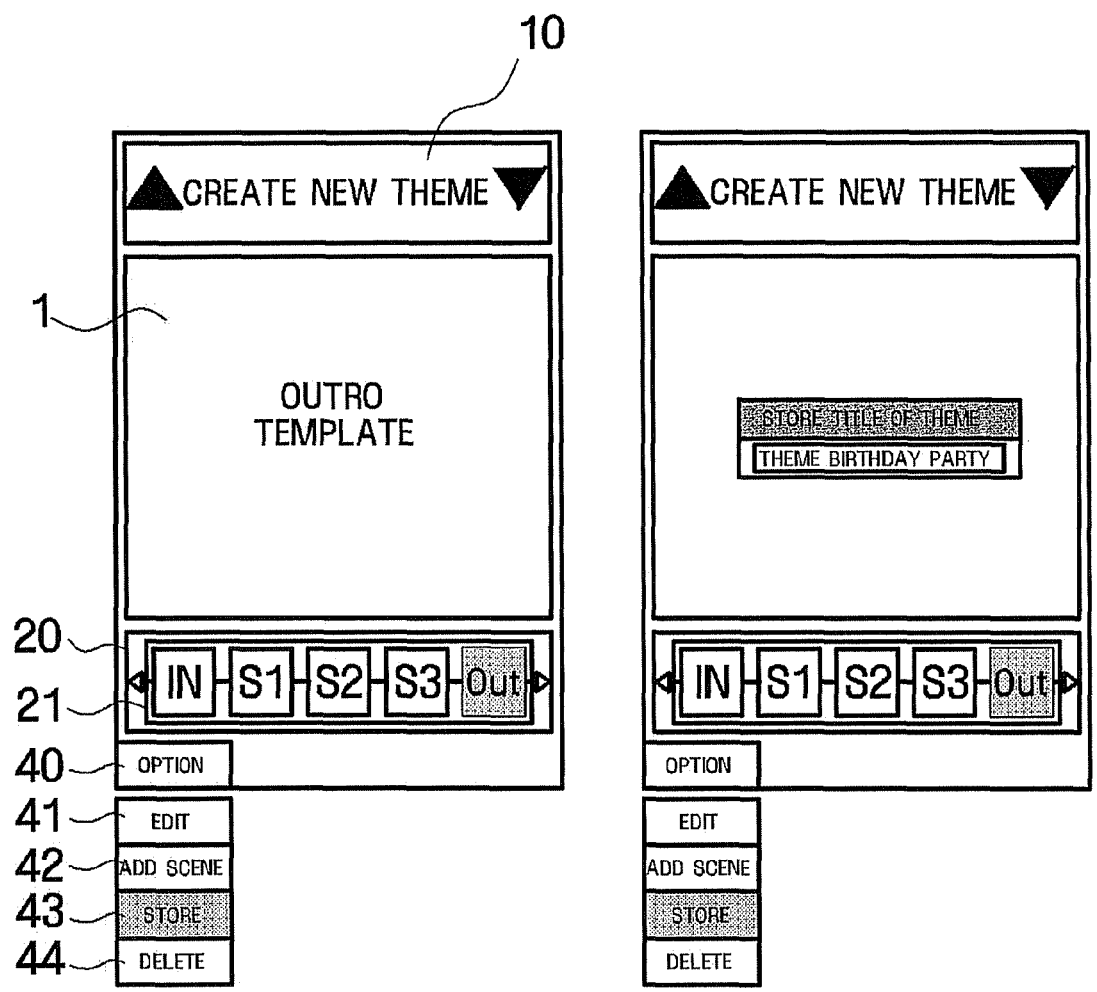
Figure 5:
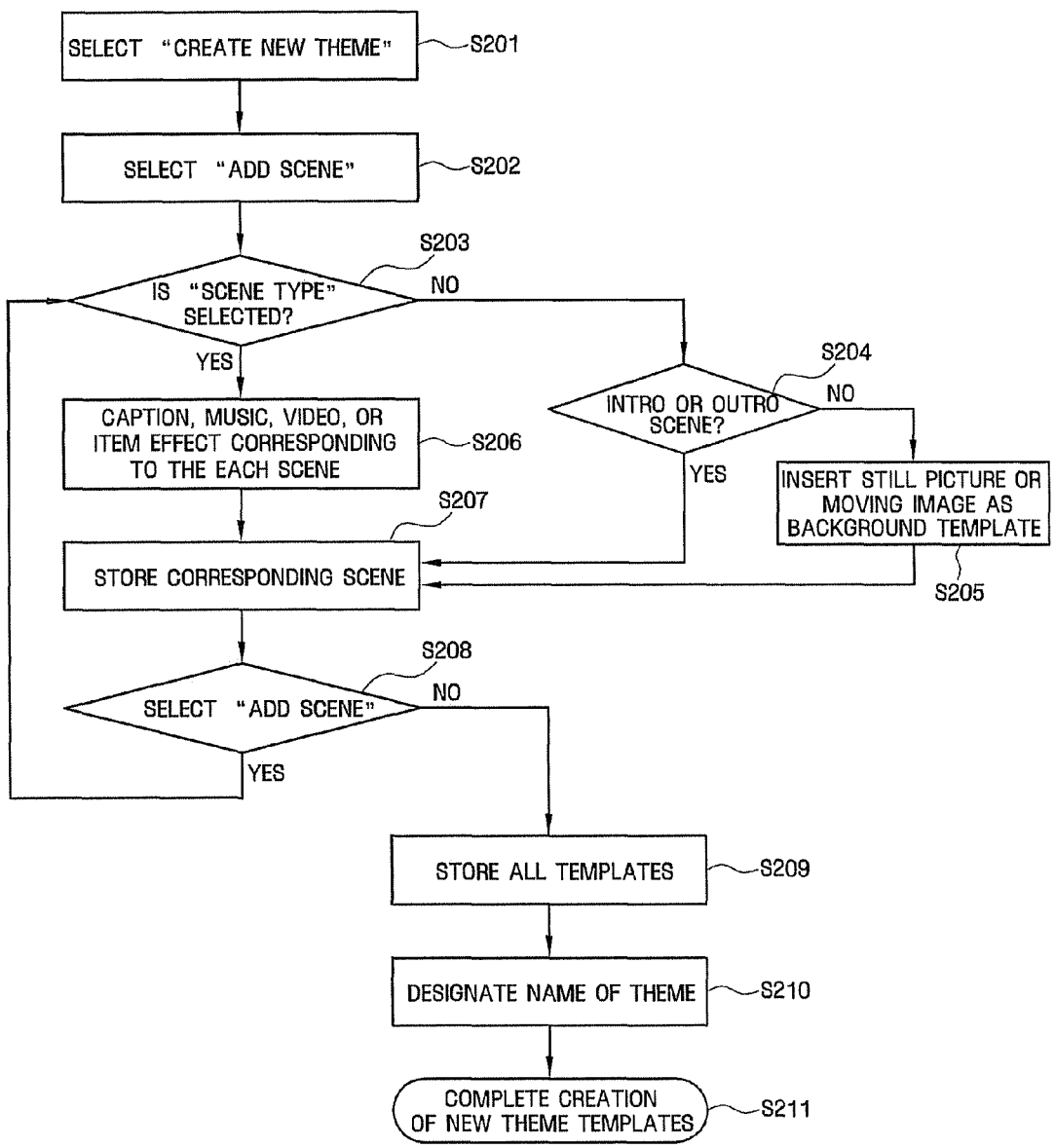
FIG. 5 is a flowchart illustrating a method of creating a moving image theme according to an embodiment of the present invention.

FIGS. 4A through 4C are diagrams illustrating a sequence of display screens in a method of creating a moving image theme according to an embodiment of the present invention, and FIG. 5 is a flowchart illustrating a method of creating a moving image theme according to an embodiment of the present invention. Referring to FIGS. 4A through 4C and 5, the moving image theme capturing method according to aspects of the present invention enables a user to directly create a new theme template.

In more detail, as shown in FIG. 4A, the theme selector 10 selects an option to create a new theme (for example, "Create New Theme) in operation S201. Next, an option to add a scene (for example, "Add Scene") is selected from the story board 21 in operation S202.

Then, an option to set a scene type (for example, "Scene Type") is selected in operation S203. For example, the type of a scene may be selected from among an intro scene, an outro scene, and photograph scenes. If the selected scene type is an intro scene or outro scene in operation S204, a caption template suitable for the corresponding scene may be selected. If the selected scene type is not an intro scene or out scene in operation S204, a still picture or a moving image is inserted as a background template and then edited in operation S205. If the selected scene type is a photograph scene, an appropriate template effect (for example, a background frame, caption, music, video, and/or item effect) corresponding to the scene is set in operation S206. Next, the corresponding scene clip is stored in operation S207.

As shown in FIG. 4B, if "Add Scene" is selected again from the story board 21 in operation S208, the method returns to operation S203. Conversely, if "Add Scene" is not selected in operation S203, all the templates are stored in operation S209.

Next, as shown in FIG. 4C, a title of the theme is designated in operation S210, and the creation of a new theme template is completed in operation S211.

If the option unit 40 selects the theme download unit 45, according to a user command, to download a new theme template (for example, from a service provider through the Internet), the downloaded theme template becomes a selectable theme for the theme selection unit 10.

Figure 6:
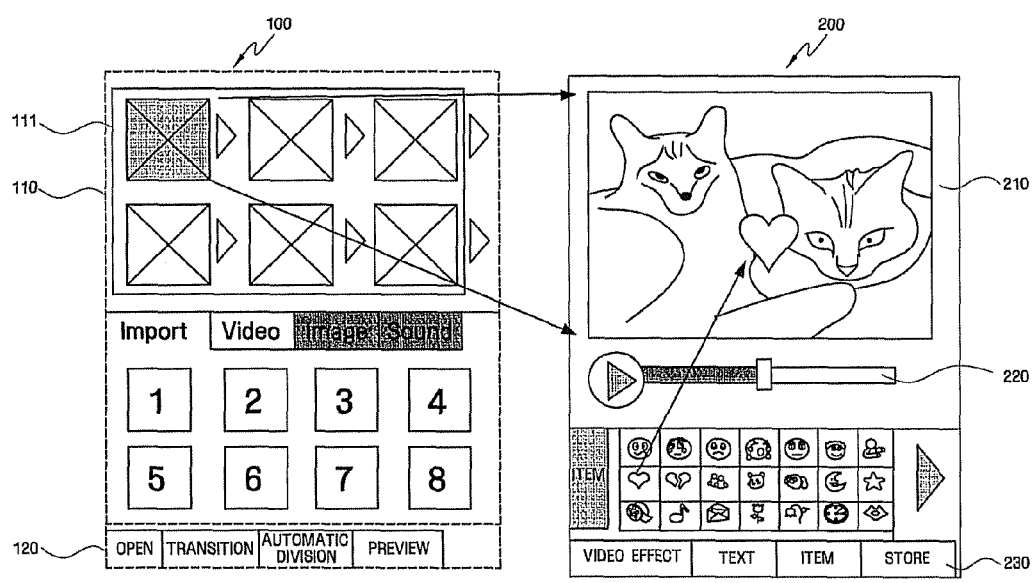
FIG. 6 is a schematic diagram of an apparatus to edit a moving image theme according to another embodiment of the present invention.

FIG. 6 is a schematic diagram of an apparatus for editing a moving image theme according to another embodiment of the present invention. Referring to FIG. 6, the moving-image-editing apparatus is provided with a story mode 100 and a trimming mode 200. Here, the moving-image-editing apparatus according to aspects of the present invention can be applied to mobile devices (such as mobile phones, digital cameras, camcorders, etc.).

In the story mode 100, an image file of a moving image stored in the apparatus is loaded, and scene clips of the corresponding file are arranged in order in a story board 111.

The story mode 100 displays a scene clip editor window 110 and a tool panel 120. The scene clip editor window 110 displays a plurality of scene clips arranged in the story board 111, and the tool panel 120 enables loading of moving image files, screen division, or scene transition effect inserting.

In the story mode 100, the plurality of scene clips arranged on the story board 111 are edited into a single moving image such that the scene clips are sequentially connected to one another. In addition, in the story mode 100, a moving image may be divided into a plurality of scene clips such that a scene transition effect clip can be inserted into one or more of the divided scene clips to be edited into a single moving image.

In the trimming mode 200, a predetermined trimming operation is performed on the scene clip selected in the story mode 100. The trimming mode 200 includes a moving image preview window 210, a timeline 220, and a tool panel 230. The tool panel 230 enables editing a video, text, or item insertion effect for one or more scene clips selected in the story mode 100.

Figure 7:
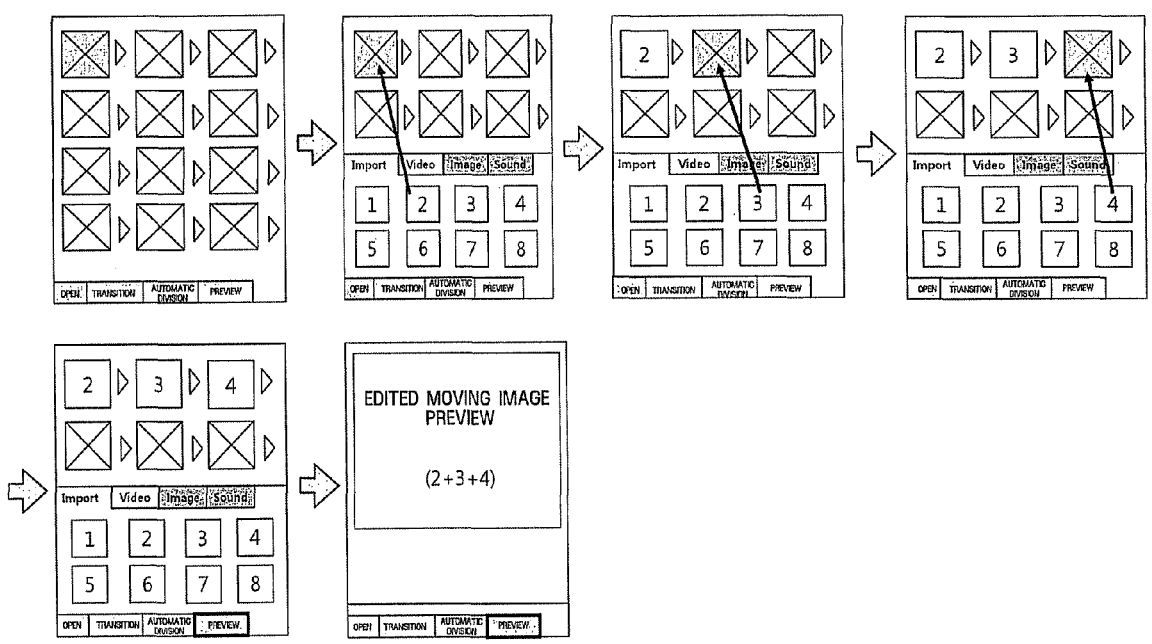
FIG. 7 is a diagram illustrating a sequence of display screens in a moving image editing method according to an embodiment of the present invention, in which multiple scenes are connected to one another to be edited into one moving image.

Hereinafter, moving image editing methods according to embodiments of the present invention will be described in detail with reference to FIGS. 7 through 9B. FIG. 7 is a diagram illustrating a sequence of display screens in a moving image editing method according to an embodiment of the present invention, in which multiple scenes are connected to one another to be edited into one moving image. Referring to FIG. 7, in the story mode 100, "Open" is clicked to load a moving image file. Then, scene clips of the invoked moving image file are sequentially arranged in a story board 111. Next, if "Preview" is clicked, the scene clips arranged in the story board 111 are sequentially connected to one another to create a moving image story.

Figure 8:
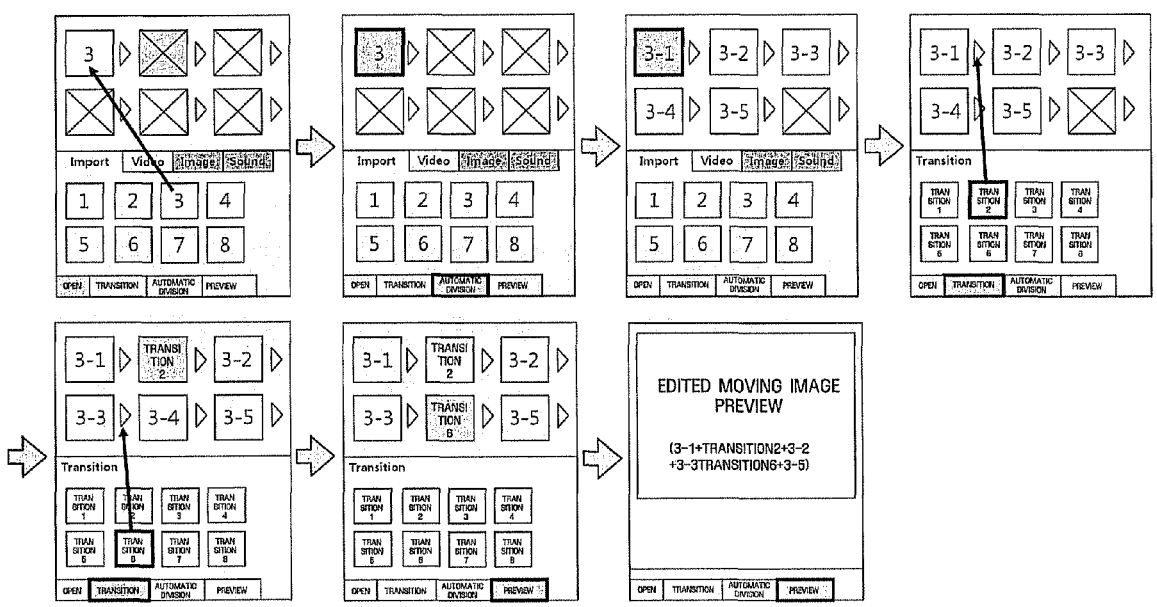
FIG. 8 is a diagram illustrating a sequence of display screens presented in a moving image editing method according to an embodiment of the present invention, in which a moving image is divided into multiple scenes and a scene transition effect clip is inserted into each of the multiple scenes.

FIG. 8 is a diagram illustrating a sequence of display screens presented in a moving image editing method according to an embodiment of the present invention, in which a moving image is divided into multiple scenes and a scene transition effect clip is inserted into each of the multiple scenes. Referring to FIG. 8, a moving image file in a story mode 100 is clicked and the image file is divided into multiple scene clips. Here, unnecessary scene clips are deleted and only necessary scene clips are left by double clicking the divided scene clips on the story board 111 to view the contents thereof. Next, "Transition" is clicked to insert a scene transition effect clip into one or more of the multiple scene clips, followed by previewing the edited moving image.

Figure 9A:
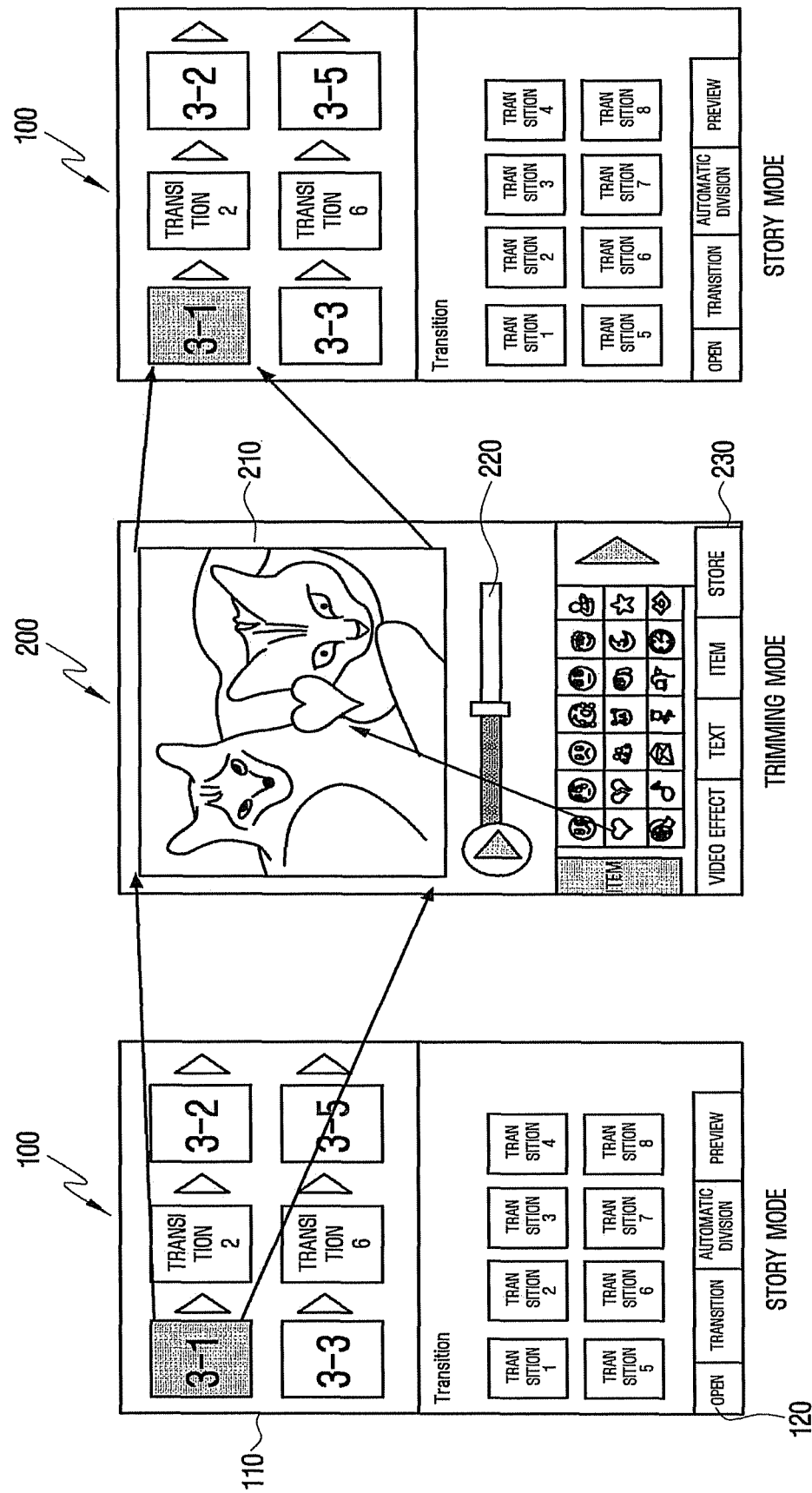
FIGS. 9A and 9B illustrate a sequence of display screens presented in editing a scene effect in a trimming mode transitioned from a story mode according to a moving image editing method of an embodiment of the present invention.
Figure 9B:
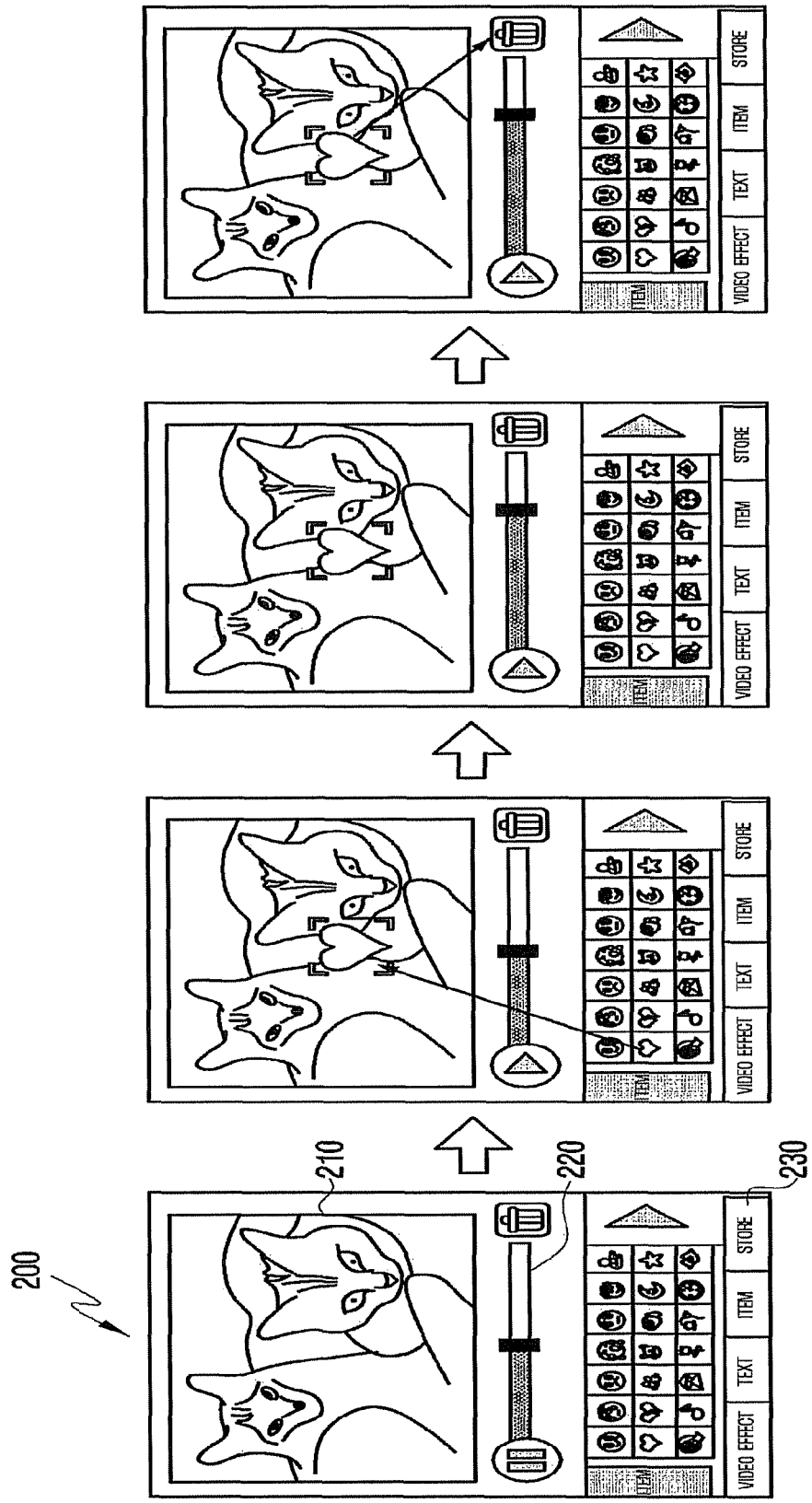

FIGS. 9A and 9B illustrate a sequence of display screens presented in editing a scene effect in a trimming mode transitioned from a story mode according to a moving-image-editing method of an embodiment of the present invention.

Referring to FIG. 9A, in a story mode 100, a desired scene clip is selected to then be transitioned into a trimming mode 200. In the trimming mode 200, the selected scene clip is magnified and played in real time. The story mode 100 is transitioned into the trimming mode 200 by double-clicking the scene clip.

Then, while playing the scene clip in the trimming mode 200, effect editing (such as video, text, or item insertion) is performed. For example, as shown in FIG. 9B, in the trimming mode 200, a scene clip is played and paused at a desired location and an item panel is then opened. A selected item is dragged and dropped onto a location of the scene clip, causing the selected icon to be inserted into the location.

After inserting the item, if the scene clip is played again and paused at a desired location, the item can be removed at a current time on a timeline 220. That is, to insert a heart-shaped item into a 2:00-2:30 (min:sec) pane, the scene clip is played and paused at a 2:00 pane, and the heart-shaped item is dragged and dropped onto a location of the scene clip. Then, the scene clip is played and paused at a 2:30 pane, and the previously inserted heart-shaped item is dragged and dropped from the location of the scene clip to a bin. A video effect or text insertion can also be edited by the same method as described above in real time basis.

As described above, the apparatus and method for photographing and editing a moving image according to aspects of the present invention has a number of advantages. First, even a user who is unfamiliar with capturing a moving image can easily create and share moving image user-created content (UCC) by providing a user interface that allows the user to use a theme-adaptable template in advance or to download one from a service provider in a mobile environment. Second, moving image UCC can be easily created since a moving image captured by a mobile device having a small screen size using a moving image editor interface in a mobile environment is easily and effectively edited according to aspects of the present invention.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to capture a moving image based on a theme of the moving image, the apparatus comprising:
   a theme selector configured to select the theme of the moving image to be captured according to a user command;
   a story board unit configured to provide a story board according to the selected theme, the story board including a plurality of scene clips which correspond to portions of the moving image to be captured;
   a scene selector configured to select, according to a user command, a scene clip from the plurality of scene clips of the story board;
   a photographing unit configured to capture a portion of the moving image corresponding to the selected scene clip; and
   a display unit configured to display a template corresponding to the selected scene clip while the photographing unit captures the portion of the moving image corresponding to the selected scene clip.

2. The apparatus as claimed in claim 1, wherein the plurality of scene clips includes an intro scene clip corresponding to an introductory scene of the story board, one or more photograph scene clips corresponding to one or more display screens of the story board;
   and an outro scene clip corresponding to an ending scene of the story board.

3. The apparatus as claimed in claim 1, further comprising an option unit configured to set a predetermined option for the selected scene clip according to a user command.

4. The apparatus as claimed in claim 3, wherein the option unit includes a template editor configured to edit the template corresponding to the selected scene clip.

5. The apparatus as claimed in claim 4, wherein the template editor edits a background frame, a caption, music, video, an item effect of the template, or any combination thereof.

6. The apparatus as claimed in claim 3, wherein the option unit includes a theme creator to create a new theme according to a user command.

7. The apparatus as claimed in claim 6, wherein the theme creator adds a scene clip to a story board of the new theme, edits a template corresponding to the added scene clip, and stores the template.

8. The apparatus as claimed in claim 3, wherein the option unit includes a theme-download unit configured to download a new theme according to a user command.

9. The apparatus as claimed in claim 8, wherein the theme-download unit downloads the new theme from a service provider via the Internet.

10. The apparatus as claimed in claim 1, wherein the theme selector selects the theme from among a screen division theme, a birthday theme, an anniversary theme, a travel theme, a childcare theme, a normal photographing theme, a news theme, a drama theme, and a sports theme.

11. The apparatus as claimed in claim 1, wherein the apparatus is a mobile device.

12. A method of capturing a moving image based on a theme of the moving image, the method comprising:

selecting the theme of the moving image to be captured according to a user command;

providing a story board according to the selected theme, the story board including a plurality of scene clips which correspond to portions of the moving image to be captured;

selecting, according to a user command, a scene clip from the story board and displaying a template corresponding to the selected scene clip on a display screen; and capturing, by a photographing unit, a portion of the moving image corresponding to the selected scene clip while the template corresponding to the selected scene clip is displayed.

13. The method as claimed in claim 12, wherein the selecting of the theme comprises selecting the theme from a plurality of themes including a screen division theme, a birthday theme, an anniversary theme, a travel theme, a childcare theme, a normal photographing theme, a news theme, a drama theme, and a sports theme.

14. The method as claimed in claim 12, wherein the plurality of scene clips comprises an intro scene clip corresponding to an introductory scene of the story board, one or more photograph scene clips, and an outro scene clip corresponding to an ending scene of the story board.

15. The method as claimed in claim 12, further comprising editing the template corresponding to the selected scene clip.

16. The method as claimed in claim 15, wherein the editing of the templates comprises editing a background frame, a caption, music, video, an item effect of the template, or any combination thereof.

17. The method as claimed in claim 12, further comprising creating a new theme according to a user command.

18. The method as claimed in claim 17, wherein the creating of the new theme comprises:

adding a scene clip to a story board of the new theme;
editing a template corresponding to the added scene clip;
storing the template; and
designating a title of the new theme.

19. The method as claimed in claim 12, further comprising downloading a new theme.

20. The method as claimed in claim 12, wherein a mobile device captures the moving image.

21. A mobile device to edit a moving image, the mobile device comprising a display unit to display:

a story mode user interface in which a moving image file stored in the mobile device is opened and, in response to the opening of the moving image file, the moving image file is divided into a plurality of scene clips that are displayed sequentially in a story board in the order they are in the moving image file; and a trimming mode user interface in which one or more scene clips selected by a user from the plurality of scene clips in the story mode user interface are displayed, and a trimming operation is performed on the one or more selected scene clips according to a user command, wherein the story board is provided according to a theme which is selected by a user.

22. The mobile device as claimed in claim 21, wherein the story mode user interface includes an option to open the moving image file, an option to divide the moving image into the plurality of scene clips, an option to insert a scene transition effect between two or more of the scene clips or any combination thereof.

23. The mobile device as claimed in claim 21, wherein the story mode user interface includes an option to connect the plurality of scene clips sequentially to one another to be edited into a single moving image.

24. The mobile device as claimed in claim 23, wherein the story mode user interface includes an option to divide the moving image into the plurality of scene clips and an option to insert a scene transition effect clip between one or more of the scene clips to be edited into a single moving image.

25. The mobile device as claimed in claim 21, wherein the trimming mode user interface includes an option to edit the one or more selected scene clips with a video, an option to edit the one or more selected scene clips with audio, an option to edit the one or more selected scene clips with text, an option to edit the one or more selected scene clips with an item insertion effect, or any combination thereof.

26. A method of editing a moving image in a mobile device, the method comprising:

loading a moving image file from a memory of the mobile device;

dividing the moving image file, in response to the loading of the moving image file, into a plurality of scene clips;

displaying, on a display device of the mobile device, the plurality of scene clips of the moving image file sequentially in a story board in the order they are in the moving image file; and connecting two or more of the displayed scene clips with one another to be edited into a moving image, wherein the story board is provided according to a theme which is selected by a user.

27. The method as claimed in claim 26, further comprising:
selecting a scene clip of the plurality of scene clips according to a user command; and
performing a trimming operation on the selected scene clip according to another user command.

28. The method as claimed in claim 26, further comprising:
dividing the moving image file into the plurality of scene clips; and
inserting a scene transition effect between two or more of the scene clips.

29. The editing method as claimed in claim 27, wherein the performing of the trimming operation comprises:
editing the selected scene clip with a video, audio, text, and/or an item insertion effect.

30. A mobile device to edit a moving image, the mobile device comprising:

a storage unit configured to store a moving image file;

a story mode unit configured to load the moving image file, to divide the moving image file, in response to the loading, of the moving image file, into a plurality of scene clips of the moving image file sequentially in a story board in the order they are in the moving image file, and to select a scene clip of the plurality of scene clips according to a user command; and a trimming unit configured to perform a trimming operation on the selected scene clip according to a user command, wherein the story board is provided according to a theme which is selected by a user.

31. The mobile device as claimed in claim 30, wherein the story mode unit divides the moving image file into the plurality of scene clips, and/or inserts a scene transition effect between two or more of the scene clips.

32. The mobile device as claimed in claim 30, wherein the story mode unit connects the plurality of scene clips sequentially to one another to be edited into a single moving image.

33. The mobile device as claimed in claim 32, wherein the story mode unit divides the moving image file into the plurality of scene clips, and inserts a scene transition effect between one or more of the scene clips to be edited into a single moving image.

34. The mobile device as claimed in claim 30, wherein the trimming mode unit edits the selected scene clip with a video, audio, text, an item insertion effect, or any combination thereof.

35. A mobile device to capture and to edit a moving image file, the mobile device comprising:
- a photographing unit configured to capture the moving image file;
- a story mode unit configured to load the captured moving image file and divide the moving image file into a plurality of scene clips sequentially displayed in a story board in the order they are in the moving image file, and to select a scene clip of the plurality of scene clips according to a user command; and
- a trimming unit configured to perform a trimming operation on the selected scene clip according to a user command,
- wherein the story board is provided according to a theme which is selected by a user.

36. The mobile device as claimed in claim 35, wherein the story mode unit divides the moving image file into the plurality of scene clips, inserts a scene transition effect between two or more of the scene clips, or any combination thereof.

37. The mobile device as claimed in claim 35, wherein the story mode unit connects the plurality of scene clips sequentially to one another to be edited into a single moving image.

38. The mobile device as claimed in claim 37, wherein the story mode unit divides the moving image file into the plurality of scene clips, and inserts a scene transition effect between one or more of the scene clips to be edited into a single moving image.

39. The mobile device as claimed in claim 35, wherein the trimming mode unit edits the selected scene clip with a video, audio, text, an item insertion effect, or any combination thereof.

40. A non-transitory computer readable recording medium encoded with computer-readable instructions, that when executed by a processor, are configured to implement the method of claim 12.

41. A non-transitory computer readable recording medium encoded with computer-readable instructions, that when executed by a processor, are configured to implement the method of claim 26.

* * * * *